United States Patent [19]

Laganà et al.

[11] Patent Number: 4,459,187
[45] Date of Patent: Jul. 10, 1984

[54] PROCESS FOR STORING AND PRODUCING POWER BY STORAGE OF ALKALI METALS PRODUCED ELECTROLYTICALLY

[75] Inventors: Vincenzo Laganà, Milan; Francesco Saviano, Segrate; Giorgio Fusco, Milan, all of Italy

[73] Assignee: Snamprogetti, S.p.A., Milan, Italy

[21] Appl. No.: 150,419

[22] Filed: May 16, 1980

[30] Foreign Application Priority Data

May 29, 1979 [IT] Italy .............................. 23084 A/79

[51] Int. Cl.³ .......................... C25C 3/02; H01M 8/18
[52] U.S. Cl. ........................................ 204/68; 429/19
[58] Field of Search .............................. 204/68; 429/19

[56] References Cited

U.S. PATENT DOCUMENTS 1,585,716 5/1926 Hulin ..................................... 204/68
4,084,038 4/1978 Scragg et al. ......................... 429/19

FOREIGN PATENT DOCUMENTS 1491680 11/1977 United Kingdom .................. 204/68

Primary Examiner—Howard S. Williams
Attorney, Agent, or Firm—Morgan, Finnegan et al.

[57] ABSTRACT

A process for recovering power is disclosed, by which excess electric power is exploited for electrolyzing alkali metal hydroxides (molten) and the thusly obtained pure alkali metals are stored. When the demand of electric power becomes critical, the alkali metals are reconverted into their hydroxides and the reaction heat, along with the hydrogen produced in the reaction, is recovered to produce steam: the latter can be used either to produce electricity, or to use its heat, or both.

5 Claims, 1 Drawing Figure

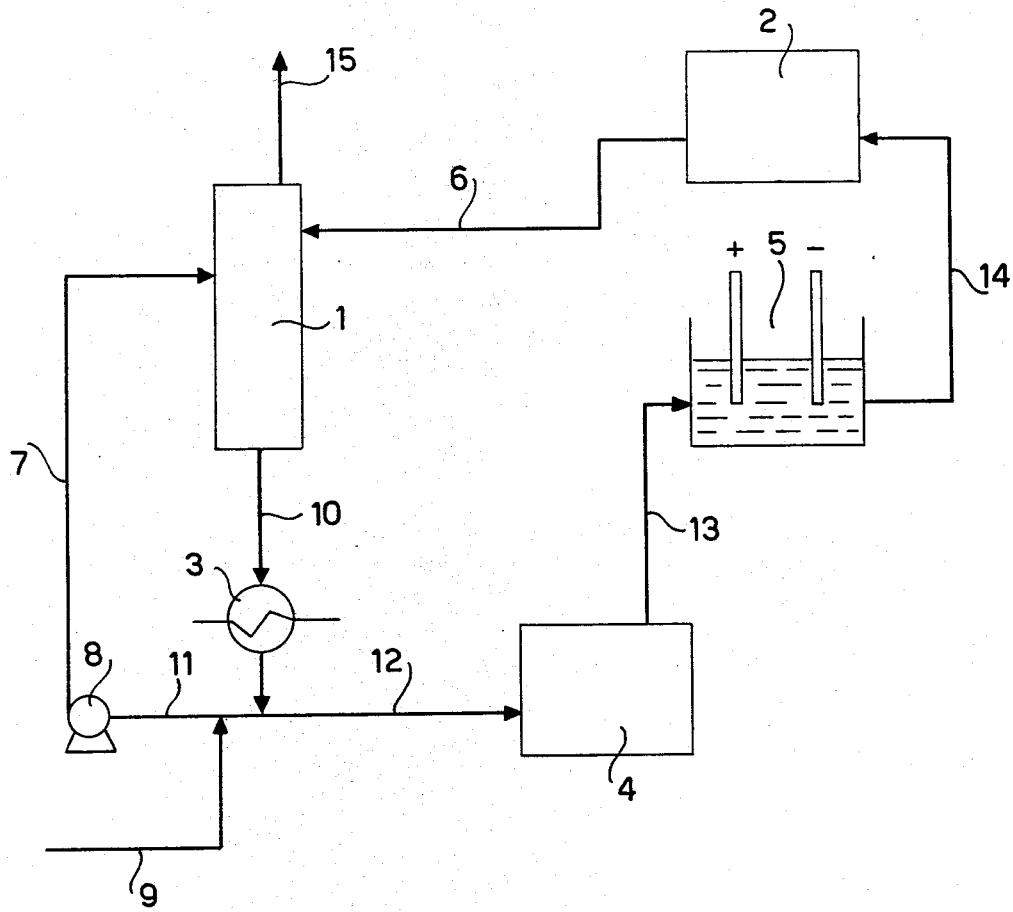

PROCESS FOR STORING AND PRODUCING POWER BY STORAGE OF ALKALI METALS PRODUCED ELECTROLYTICALLY

This invention relates to a method for accumulating and producing energy by storing alkaline metals. More particularly, the invention relates to a process, based on the storage of alkaline metals, for accumulating excess electrical energy produced during low demand periods.

High power electrical generating stations such as thermoelectric and thermonuclear power plants deliver electrical energy at a constant rate, due to the fact that their structure does not allow the rate of energy production to be adjusted rapidly in order to adapt it to continual demand variations.

The electrical energy required by the user over a complete day is not constant with time, but instead varies continuously from a minimum value during the night, to a maximum value between 19.00 and 22.00 hours.

In order to satisfy user requirements, and at the same time prevent energy wastage, large thermoelectric and nuclear power plants are operated such that they deliver electrical energy at a constant rate during the day, equal to 60-70% of the maximum load requirement. The remaining 30-40% of energy needed for satisfying the energy requirement is provided by a series of small auxiliary installations connected in parallel with the main power plant, and which usually consist of hydroelectric power plants, small gas turbines or diesel installations which, because of their flexibility, can be operated at any time to give the necessary fraction of electrical energy for satisfying contingent requirements which the main plant is unable to satisfy. However, it is apparent that such a delivery system provides excessive electrical energy during the night, during which demand is usually very low. This excess energy must now be lost, and must therefore be absolutely recovered.

At present, as indicated in "Energy" Vol. II "Non-nuclear Energy Technologies"(Addison—Wesley Publishing Company Inc. 1975) pages 241-246 by S. S. Penner and L. Icerman, the most widespread and convenient system for recovering excess electrical energy produced during low demand periods consists of operating generating and pumping installations in hydroelectric power plants. The purpose of these installations is to transfer energy during the night when utilisation is low to the day when the requirement is greater. They are based on the principle of pumping a certain quantity of water during the night into the upstream collection basin (utilising the energy produced by other power plants), and then re-using it during the day to produce more valuable peak energy.

Although this system has a fairly high overall efficiency, it is characterised by certain drawbacks which limits its functionality. Firstly, it is strictly linked to hydroelectric power plants, and can therefore only be conveniently applied in those zones or countries in which a high percentage of electrical energy is produced hydraulically. In addition, it requires not only the collection basin upstream of the hydroelectric installation, but also a collection basin downstream in order to provide the pumping system with a water buffer quantity to allow sufficiently long operating times.

Finally, as indicated in "Alternative Energy Sources"(Academic Press, 1976) page 11 by James P. Hartnett, the percentage of electrical energy produced hydraulically will gradually diminish, not only in Italy and Europe but also in the world.

On the basis of such predictions, it is therefore apparent that there is a need to find other systems for accumulating electrical energy, which can be additional to and gradually replace existing generating and pumping installations, and which have the economical convenience of these latter.

A method has now been surprisingly found for transforming and accumulating energy by storing alkaline metals, which enables good results to be obtained in terms of energy balances, avoids the typical drawbacks of pumping installations, and at the same time enables energy to be recovered without any limit on quantity. In particular, the method gives good results when using sodium and lithium as the metals, but it is apparent that other metals such as potassium or mixtures such as lithium-sodium, potassium-sodium, lithium-potassium and lithium-sodium-potassium give analogous results.

The method described herein can also be adapted to seasonal accumulations of electrical energy, in particular in combination with solar power plants. In this respect, these power plants are sized such as to be able to operate at full capacity during the winter season, and they thus operate under excessive output conditions during the summer season, i.e. when the flow of energy from the sun reaches its maximum value. The excess energy from the solar power plant during the summer can be used for storing alkaline metal, from which heat and steam can be recovered in winter.

The present invention provides a method which utilises excess electrical energy produced during low demand periods in order to electrolytically produce alkaline metals, using the corresponding molten hydroxides as the electrolyte. The metal so obtained is stored, and when the electrical energy requirement reaches its upper limits the metal is mixed with an aqueous solution of its hydroxide in such proportions as to finally obtain the hydroxide in its pure state, in its molten state together with a corresponding quantity of hydrogen. The heat of reaction evolved, and the heat of combustion of the hydrogen can be recovered in order to produce steam at high temperature, which in its turn can act either as a drive fluid for again producing electrical energy, or simply as a heat source for heating or similar purposes.

More particularly, the present invention comprises the following process stages:

(a) Electrolysing an alkaline hydroxide in its molten state by using excess electrical energy produced during low demand periods, and accumulating the metal produced in suitable storage vessels.

(b) Exothermically reacting the alkaline metal with an aqueous solution of its hydroxide in a suitable vessel, in order to produce hydrogen and the pure hydroxide in its molten state, and then producing high temperature steam for use either as a drive fluid in electrical energy production systems, or simply as a heat source, by recovering the heat of reaction and by burning the hydrogen produced.

(c) After heat transfer, recovering part of the hydroxide corresponding to the reacted metal, and feeding it to a collection vessel.

(d) During low demand periods, recycling the hydroxide from point C to the electrolysis stage, for accumulating excess electrical energy produced.

(e) Mixing the remaining hydroxide with water, and recycling the mixture obtained to the reaction vessel, possibly after storing it.

According to the method of the present invention, the excess electrical energy produced during low demand periods is used for operating electrolytic cells in which an alkaline metal hydroxide is used as the electrolyte. The metal then obtained is accumulated in suitable containers, and is ready for re-use when the electrical energy requirement exceeds the normal average. During such periods, the metal is then fed to a reaction vessel where it is mixed and reacted with an aqueous solution of its hydroxide in order to form a single compound constituted by the hydroxide of the metal used, which is maintained in its molten state by virtue of the heat of reaction.

Although the reaction between an alkaline metal and water is strongly exothermic, and in some cases, for example sodium and lithium, can be explosive, it is important to note that our method obviates such dangers, i.e. explosions and uncontrolled heat development, because the presence of the hydroxide in the reaction mixture allows a double result to be obtained, i.e. the absorption of heat of reaction and the control of the metal-water reaction, by facilitating gradual contact between the two elements.

The concentration of the alkaline metal hydroxide solution is of over-riding importance for the proper progress of the process, as the use of a very dilute solution makes reaction control difficult, whereas the use of a very concentrated solution does not enable a sufficient quantity of heat to be recovered per unit of time for the purposes for which the method is intended. In addition, the solution concentration depends on the type of alkaline metal used, and if this metal is sodium then it is advantageous to operate with solutions having a concentration of between 10% and 98% by weight. The temperature inside the reactor is always dependent on the reaction between the metal and the solution water. In all cases, the process is carried out such as to obtain a temperature exceeding the melting point of the hydroxide produced, and in the case of sodium hydroxide, the temperature fluctuates between 400° and 650° C.

The reactor operating pressure depends on the solution concentration, and must be such as to prevent the solution boiling at its inlet concentration and temperature. In the case of sodium hydroxide, this is between 4 and 50 kg/cm$^2$. Hydrogen is evolved from the reaction between the alkaline metal and the solution of its hydroxide. In the case of sodium, each kg of Na produces 0.51 Nm$^3$ of H$_2$, which having a calorific value of 58.3 Kcal/mole constitutes a further heat source.

The molten alkaline hydroxide obtained at the end of the reaction is discharged from the reactor and fed to a heat exchanger in order to produce steam. After heat transfer, the hydroxide leaves at a temperature still slightly greater than its melting point so that it can be handled easily, and is divided into two parts. The first part, corresponding to the reacted alkaline metal, is stored and is ready for recycling to said electrolysis stage in order to re-accumulate excess electrical energy produced during low demand periods, while the second part is mixed with water to form the aqueous solution which is recycled and used in the reaction vessel.

The method therefore consists of two process cycles, one for the alkaline metal and the other for its hydroxide, these cycles having the chemical reaction stage and heat transfer stage in common.

In describing the method, it has been assumed that the chemical reaction is such as to obtain the alkaline hydroxide completely free from water at the end, but this is not an absolute restriction given that if a very high concentrated solution is discharged from the reactor instead of the molten hydroxide, the same results can be obtained.

The method of the present invention is illustrated hereinafter in a more detailed but non-limiting manner with reference to the flow diagram of the accompanying FIGURE.

The excess electrical energy produced during low demand periods is used for producing an alkaline metal by utilising the electrochemical cell 5. The metal thus obtained is fed through line 14 to an accumulation vessel 2 where it remains stored while the energy demand remains at low level. When the demand increases, the alkaline metal is fed through line 6 to the reactor 1, which receives the aqueous solution of the metal hydroxide through line 7. The solution water reacts in the reactor 1 with the alkaline metal, such that the discharge through line 10 consists either of high temperature molten hydroxide or a very concentrated high temperature solution, and the hydrogen produced by the reaction is fed through line 15 to a boiler, not shown in the FIGURE.

The molten hydroxide is fed to the heat exchanger 3 where the heat of reaction is recovered. After heat transfer, the hydroxide is divided into two parts. One part, equivalent to the metal taken from the vessel 2, is fed through line 12 to the storage vessel 4, from which it is withdrawn during periods of excessive electrical energy and recycled to the electrochemical cell 5 through line 13, while the second part, after injecting water through line 9, is fed through line 11 to the pump 8 which recycles the solution to the reactor.

An example is described hereinafter in order to better illustrate the invention, but without limiting it.

EXAMPLE 1 kg of sodium at ambient temperature is withdrawn from the storage vessel, and is fed to the reactor together with 10.85 kg of a 92.46 weight % solution of NaOH at a temperature of 350° C. In order to prevent the solution boiling, a pressure of 6 kg/cm$^2$ is maintained inside the reactor. 0.51 Nm$^3$ of hydrogen at 100° C., the combustion of which recovers 1518 Kcal, are discharged from the reactor, together with 11.81 kg of sodium hydroxide at a temperature of 634° C., which are fed to the heat exchanger. 1071.44 Kcal are recovered from this apparatus, and the sodium hydroxide is discharged at a temperature of 350° C. 1.7 kg of sodium hydroxide, corresponding to the amount of sodium reacted, are stored in a suitable vessel, while the remaining 10.11 kg of sodium hydroxide at a temperature of 350° C. are mixed with 0.74 kg of water, to re-form the solution, which is recycled to the reactor.

During periods of excess electrical energy, the stored sodium hydroxide is fed to an electrolysis cell, from which the original amount of sodium is recovered, this in its turn being stored so that it is ready for re-use in producing energy.

We claim:

1. A method for accumulating energy by storing alkaline metals, comprising the following stages:
   (a) Electrolysing an alkaline hydroxide in its molten state by using excess electrical energy produced during low demand periods, and accumulating the metal produced in suitable storage vessels;

(b) Exothermically reacting the alkaline metal with an aqueous solution of its hydroxide in a reaction vessel, in order to produce hydrogen and the pure hydroxide in its molten state, and then producing high temperature steam for use either as a drive fluid in electrical energy production systems, or simply as a heat source, by recovering the heat of reaction and by burning the hydrogen produced;

(c) After heat transfer, recovering part of the hydroxide corresponding to the reacted metal, and feeding it to a collection vessel;

(d) During low demand periods, recycling the hydroxide from point C to the electrolysis stage, for accumulating excess electrical energy produced;

(e) Mixing the remaining hydroxide with water, and recycling the mixture obtained to the reaction vessel.

2. A method as claimed in claim 1, wherein the alkaline metal is chosen from sodium, lithium, potassium, or lithium-sodium, potassium-sodium, lithium-potassium and lithium-sodium-potassium mixtures.

3. A method as claimed in claim 1, wherein the alkaline metal is sodium.

4. A method as claimed in claim 3, wherein the sodium hydroxide solution fed to the reactor has a concentration of between 10% and 98% by weight.

5. The method of claim 1 wherein the remaining hydroxide and water mixture obtained from point (e) is recycled to the reaction vessel after storing it.

* * * * *